Aug. 23, 1932.  R. H. AHLERS  1,873,172

CONNECTING LINK FOR SHOCK ABSORBERS

Filed May 1, 1930

Inventor
Robert H. Ahlers
By Spencer, Hardman and Fehr
Attorneys

Patented Aug. 23, 1932

1,873,172

UNITED STATES PATENT OFFICE

ROBERT HERMAN AHLERS, OF DAYTON, OHIO, ASSIGNOR TO DELCO PRODUCTS CORPORATION, OF DAYTON, OHIO, A CORPORATION OF DELAWARE

CONNECTING LINK FOR SHOCK ABSORBERS

Application filed May 1, 1930. Serial No. 448,941.

This invention relates to improvements in motion transmitting devices.

It is among the objects of the present invention to provide a motion transmitting device or link, having swivel joints at its ends.

Another object of the present invention is to provide a motion transmitting link of simple structure and design, capable of being produced commercially at a minimum expense.

Further objects and advantages of the present invention will be apparent from the following description, reference being had to the accompanying drawing wherein a preferred embodiment of one form of the present invention is clearly shown.

Figure 1:
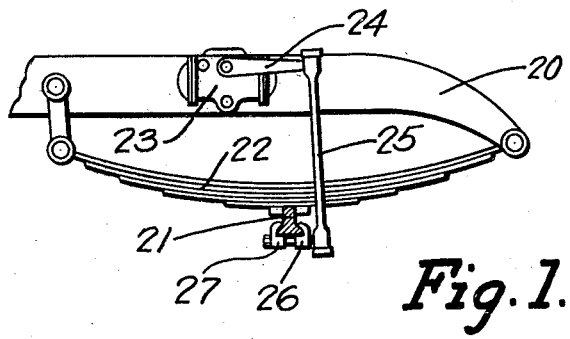
Fig. 1 is a fragmentary side view of a vehicle chassis having the new device applied thereto. The road wheels of the vehicle have been omitted for the sake of clearness.
Figures 2, 3:
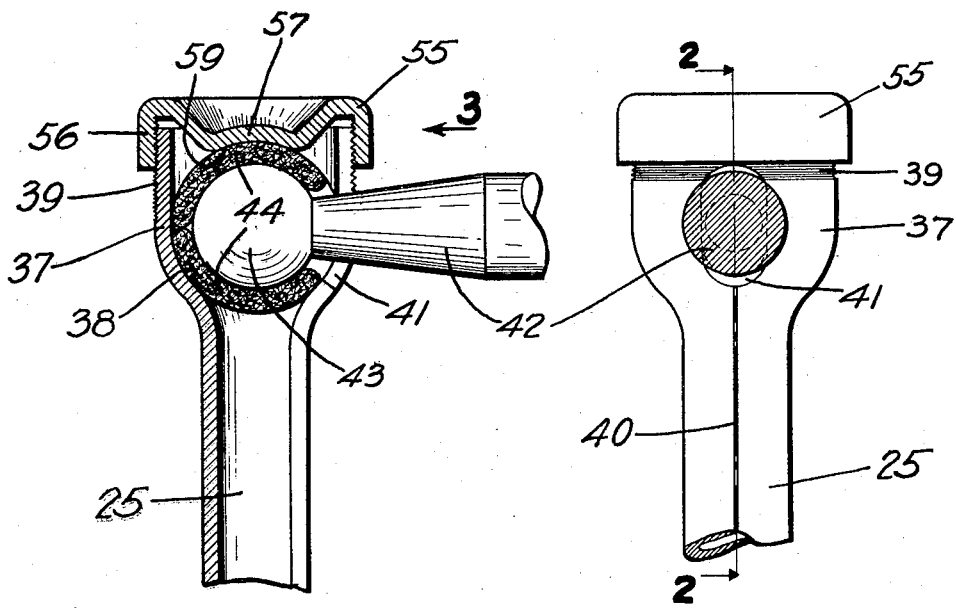
Fig. 2 is a longitudinal, sectional view taken along the line 2—2 of Fig. 3.
Fig. 3 is a view in elevation of Fig. 2, taken in the direction of the arrow 3.

Referring to the drawing, the numeral 20 designates the frame of a vehicle which is supported upon the axle 21 by springs 22.

The frame 20 is shown supporting a double-acting hydraulic shock absorber 23, having an operating arm 24.

The shock absorber 23 is adapted to control the approaching and separating movements between the frame 20 and axle 21 and therefore must be connected with the axle. In the present instance a link 25 is provided, one end of which is swivelly secured to the operating arm 24 of the shock absorber, the other end of which is swivelly attached to a bracket 26, which in turn is anchored to the axle 21 by a clamping member 27.

In the present invention the link 25 is a tubular formation of sheet metal, having abutting edges forming an open seam 40. Generally in tubular links the seam thereof is welded together. In the present invention the expense of welding the seam is eliminated.

Both ends of the link being the same, only one thereof will be described, for the sake of brevity.

The link 25 has an enlarged tubular end formation 37, providing a curved, interior, annular shoulder 38. Adjacent the outer end of the enlarged tubular portion 37, screw threads 39 are provided on its exterior surface. An opening 41 is provided on the side of the enlarged tubular end 37, said opening having a stub shaft 42 extending therethrough. The end of the stub shaft extending into the enlarged tubular portion 37 is ball-shaped as at 43. The bearing material 44 surrounds the spherical surface of the ball-shaped end 43 of the stub shaft 42, said bearing material preferably being of a flexible, fibrous character which, by pressure, may adapt itself to the formation of the ball end 43 and the interior of the link.

A cover cap 55, having an annular flange 56, is provided with interior screw threads, threadedly engages the threaded end of the tubular portion 37 of link 25. Cap 55 is provided with a central portion 57, presenting a concave surface 59, forming a socket which engages the bearing material on one side of the ball end 43. As the cap 55 is screwed upon the tubular end 37, the concave surface 59 of the cap 55 will engage the bearing material on one side of the ball end 43 and urge the ball end toward the curved shoulder 38 within the tubular link; thus cap 55 urges and maintains the ball end 43 and its surrounding bearing material 44 in proper position within the link.

Cap 55 not only maintains the ball end shaft in proper position within the link, but it also provides a surrounding reinforcement member about the tubular end 37, substantially preventing spreading of the open seam 40 therein.

It may readily be seen that applicant has provided a comparatively cheap, yet sturdy and efficient link production costs being reduced inasmuch as welding is entirely eliminated.

While the form of embodiment of the present invention as herein disclosed, constitutes a preferred form, it is to be understood that other forms might be adopted, all coming within the scope of the claims which follow.

What is claimed is as follows:

1. A motion transmitting device comprising, in combination, a tubular member formed from sheet metal and having an open, longitudinal seam; an enlarged tubular end on said member, having a side opening, said enlarged end forming a curved, annular shoulder; a ball end stub shaft extending into the enlarged tubular end through its side opening; bearing material surrounding the ball end of the stub shaft; and a cap screw-threaded about the enlarged end of the tubular member, having a central, concaved portion forming a socket which engages the bearing material on one side of the ball end and urges said ball end with its bearing material into proper position upon the shoulder within the tubular member, said cap acting as a clamp about the open seamed tubular member substantially preventing the spreading thereof.

2. A motion transmitting device comprising in combination, a tubular member formed from sheet metal and having an open, longitudinal seam; an enlarged tubular end on said member, having a side opening, said enlarged end forming a curved, annular shoulder; a ball end stub shaft extending into the enlarged tubular end through its side opening, flexible bearing material fitting about the spherical surface of the stub shaft one side thereof engaging the annular shoulder in the tubular member; a cap having an interiorly threaded annular flange fitting about the tubular member, said cap having a central portion providing a concaved surface for engaging one side of the bearing material and urging it and the ball end of the stub shaft into proper position within the tubular member, said cap also reinforcing the tubular member substantially to prevent spreading of the open seam thereof.

In testimony whereof I hereto affix my signature.

ROBERT HERMAN AHLERS.